United States Patent
Werth et al.

[11] Patent Number: 6,115,901
[45] Date of Patent: Sep. 12, 2000

[54] TOOL FOR BREAKING BRAKE DISKS

[75] Inventors: Michael Werth, Unterschleissheim; Dieter Bieker, Oberaudorf, both of Germany

[73] Assignee: Knorr-Bremse Systeme für Nutzfahrzeuge GmbH, Germany

[21] Appl. No.: 09/319,738

[22] PCT Filed: Sep. 28, 1998

[86] PCT No.: PCT/EP98/06156

§ 371 Date: Jul. 30, 1999

§ 102(e) Date: Jul. 30, 1999

[87] PCT Pub. No.: WO99/19641

PCT Pub. Date: Apr. 22, 1999

[30] Foreign Application Priority Data

Oct. 13, 1997 [DE] Germany .......................... 197 45 241

[51] Int. Cl.[7] ............................ B23P 19/04; B23P 23/00; B23P 6/00

[52] U.S. Cl. .................................. 29/402.03; 29/402.08; 29/426.4; 29/426.5; 29/233

[58] Field of Search ................................ 29/426.4, 426.5, 29/402.08, 402.03, 233, 234, 560.1

[56] References Cited

U.S. PATENT DOCUMENTS

| | | |
|---|---|---|
| 3,835,522 | 9/1974 | Ward .......................................... 29/239 |
| 4,086,828 | 5/1978 | Mader ........................................ 29/239 |

FOREIGN PATENT DOCUMENTS 42 30 005 A1   3/1994   Germany .

OTHER PUBLICATIONS

Der sichere Weg zur Meisterprüfung im Kfz–Handwerk, Pkw–Bremsen, Krad–Bremsen, Falf Leiter.

Der sichere Weg zur Meisterprüfung im Kfz–Handwerk, Nutzfahrzeug–bremsen, Hans–Peter Klug.

*Primary Examiner*—David P. Bryant
*Assistant Examiner*—Jermie E. Cozart
*Attorney, Agent, or Firm*—Barnes & Thornburg

[57] ABSTRACT

A breaking device for fracturing an unbroken brake disk in its mounted state. The breaking device has breaking or cutting irons which can be set on the brake disk.

10 Claims, 3 Drawing Sheets

TOOL FOR BREAKING BRAKE DISKS

BACKGROUND AND SUMMARY OF THE INVENTION

The invention relates to a process for breaking an unbroken brake disk of a disk brake in the mounted condition, to a process for exchanging a brake disk of a disk brake in the unbroken condition as well as to a breaking device for breaking an unbroken brake disk.

Nowadays, disk brakes are increasingly used particularly in the utility vehicle field, in which it is important to provide brakes for the highest loads. In the case of disk brakes, during a braking, an application force is transmitted by the lining carrier to the brake lining material fastened thereon. From the application force, the braking force is obtained between the lining material or brake lining and the brake disk. Concerning the different constructions of disk brakes, reference is made to the following literature:

Prof. Dr.-Ing. Buschmann, Prof. Dr.-Ing. Koessler "Manual of Automotive Engineering", München 1976, Pages 844–847;

P. Gerigk, D. Bruhn, D. Danner, L. Endruschat, J. Göbert, H. Gross, D. Komoll "Automotive Engineering", Braunschweig 1994, Pages 425–427;

German Patent Application DE 42 30 005;

Repair Guideline RA-SB 0002, "Pneumatic Disk Brake SB6 . . . /SB7 . . . (Standard and Radial Brake)" Knorr Bremse, System für Nutzfahrzeuge GmbH, 6, 1997.

The whole disclosure content of all these documents according to the prior art is incorporated herein by reference.

In addition to the brake linings, the brake disks are naturally also subjected to a certain wear, for example, as the result of abrasion or temperature fluctuations which may result in cracks in the brake disk. If such a wear is determined or the wear limit is reached, the brake disks must be exchanged.

If the brake disk is constructed in one piece as an unbroken disk, an exchange of such a disk, particularly in the case of a utility vehicle, requires high-cost dismounting work. For example, the complete hub must often be disassembled at high cost in order to be able to exchange the worn-out brake disk.

On the other hand, it is more expensive to originally equip utility vehicles with broken, that is, multipart brake disks.

It is therefore an object of the invention to provide a process and system by which the above-described disadvantages of the prior art can be overcome.

According to the invention, this problem is solved in that a process for breaking an unbroken brake disk of a disk brake in the mounted condition is provided which has the following steps:

a breaking device is set on the brake disk, by a pressure device, a force is applied on the breaking device, specifically such that a transverse force or a bending moment is introduced into the brake disk which results in the breaking of the brake disk preferably with radially extending fracturing surfaces.

In a first embodiment of the process according to the invention, it is provided to construct the breaking device as a separate tool. This separate tool, away from the caliper of the disk brake, is set onto the brake disk itself.

In a particularly advantageous embodiment, it is provided that the breaking device comprises at least two breaking irons, the outer contour of the breaking irons being similar to brake linings so that they can be inserted into the lining shaft of the disk brake, preferably instead of the brake linings. In a further development of the invention, it is provided that the transverse forces according to the process of the invention are introduced directly by the brake pistons of the disk brake. In this case, the brake piston of the disk brake is advantageously operated pneumatically or hydraulically by the foot brake of the vehicle.

The above-described process concerning the breaking of an unbroken brake disk of a disk brake is preferably used when a brake disk of a disk brake is to be exchanged in the mounted condition. According to the invention, a process for exchanging a brake disk in the mounted condition is characterized in that the brake disk is first broken according to one of the above-mentioned processes by a breaking device, radially extending fracturing surfaces being formed in the process. The fragments of the brake disk resulting from the breakage are subsequently taken out of the caliper in the radial direction, a dismounting of axle parts or brake parts not being required.

After the old brake disk is removed in this manner from the brake system, a new multipart brake disk is installed. The multipart brake disk is composed of at least two ring-shaped pieces which are connected with one another, for example, by a bolt-type connection. Naturally, other types of connections are also conceivable in this context.

In addition to the above-mentioned breaking process and the above-mentioned process for exchanging a brake disk in the mounted condition, the invention also provides a breaking device for breaking an unbroken brake disk. According to the invention, this breaking device comprises breaking or cutting irons which can be set onto the brake disk. It is particularly preferable for the breaking or cutting irons to have an outer contour similar to brake linings. In such an embodiment, the breaking or cutting irons can be inserted into the lining shaft instead of the brake linings or together with these. The correspondingly shaped breaking or cutting irons are situated opposite one another in the lining shafts of the disk brakes and have breaking webs which are offset with respect to one another in the circumferential direction. In a special embodiment, it is provided that one of the cutting irons has breaking webs in the proximity of the two exterior ends of the breaking or cutting iron, whereas the other breaking iron, which is situated opposite the above-mentioned breaking iron, has a single breaking web which is arranged in the center. As the result of this type of an arrangement of the breaking webs on the breaking or cutting irons, it is possible to introduce, by the brake pistons of the disk brake, by the breaking or cutting irons inserted in the brake, high transverse forces or a high bending moment in the brake disk so that, as a result, a breakage of the brake disk is achieved which has fracturing surfaces extending essentially in the radial direction.

Other objects, advantages and novel features of the present invention will become apparent from the following detailed description of the invention when considered in conjunction with the accompanying drawings.

DETAILED DESCRIPTION OF THE PREFERRED EMBODIMENTS

Figure 1:
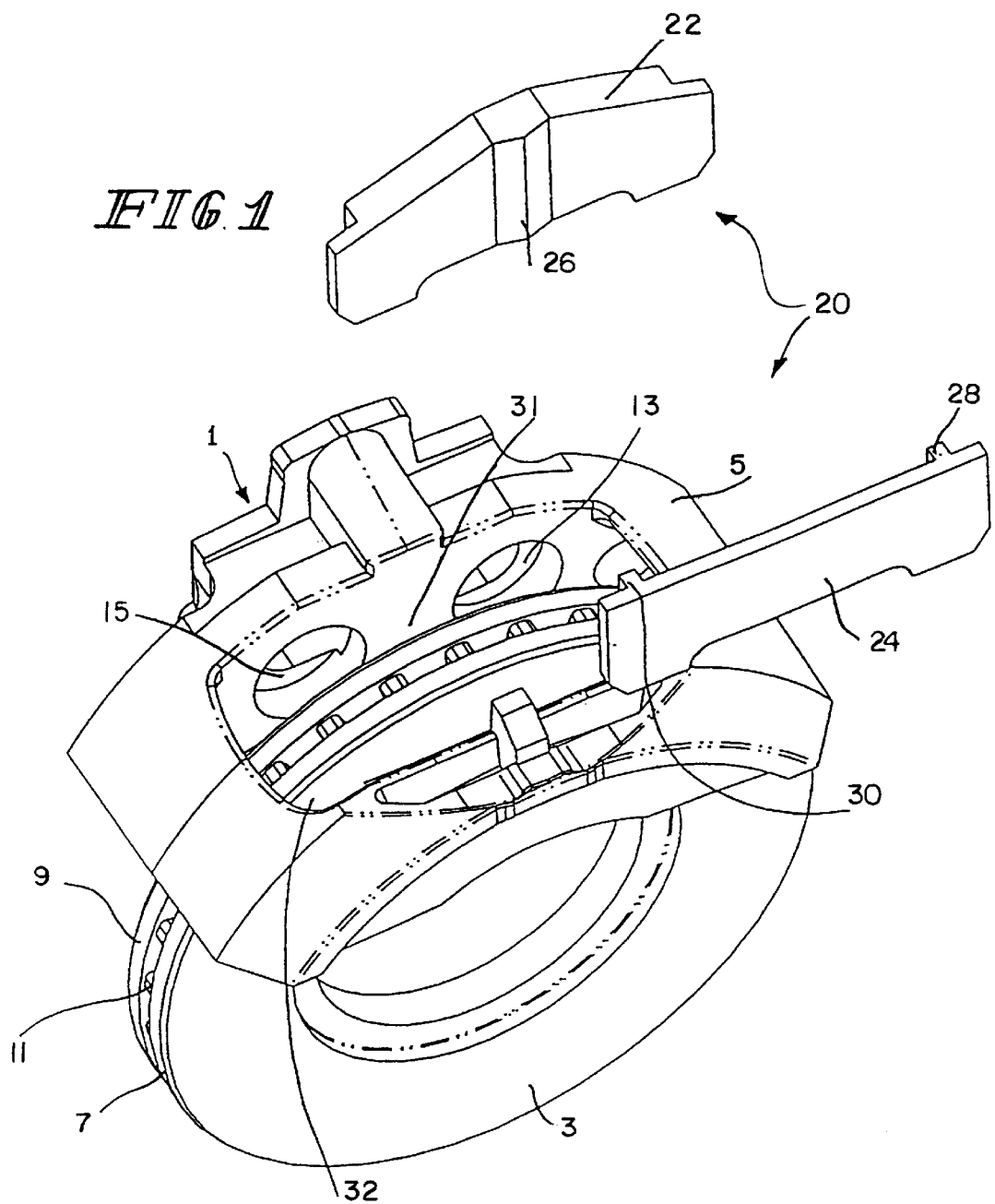
FIG. 1 is a top perspective view of a mounted caliper-type brake with a removed breaking device.

FIG. 1 is a top perspective view of a disk brake 1 comprising a brake disk 3 as well as a caliper 5. The illustrated caliper-type brake is a so-called swinging-caliper brake without limiting the invention. In contrast to, for example, the fixed-caliper brake, the swinging-caliper brake comprises cylinders with pistons only on one side. The swinging caliper is laterally displaceably disposed on a holder which is fixedly screwed to the wheel suspension. It transmits the tension forces of the pistons to the opposite brake lining. A swinging-caliper brake of this type, as it is used particularly in the case of utility vehicles, is described in detail in the Repair Guideline RA-SG0002. "Pneumatic Disk Brake SB6../SB7.. (Standard and Radial Brake)", Knorr-Bremse, 0.6.97, whose disclosure content is incorporated herein by reference.

The brake disk has cooling ribs 11 between the friction rings 7, 9, without any limitation of the invention to brake disks of this type. Naturally, massive disks can also be used. Recesses 13, 15 for the brake pistons 34, 36 (FIG. 2) of the disk brake are provided in the caliper itself.

In the present embodiment, the breaking tool 20 according to the invention is composed of two breaking irons 22, 24. In FIG. 1, the breaking tool 20 is shown in the dismounted form. Breaking iron 22 has a breaking web 26 which is essentially arranged in the center; whereas breaking iron 24 comprises two breaking webs 28, 30 arranged essentially at the ends of the cutting tool.

In the present embodiment, the two breaking irons 22, 24 are constructed such that, with respect to their outer dimensions, they correspond essentially to a brake lining.

Figure 2:
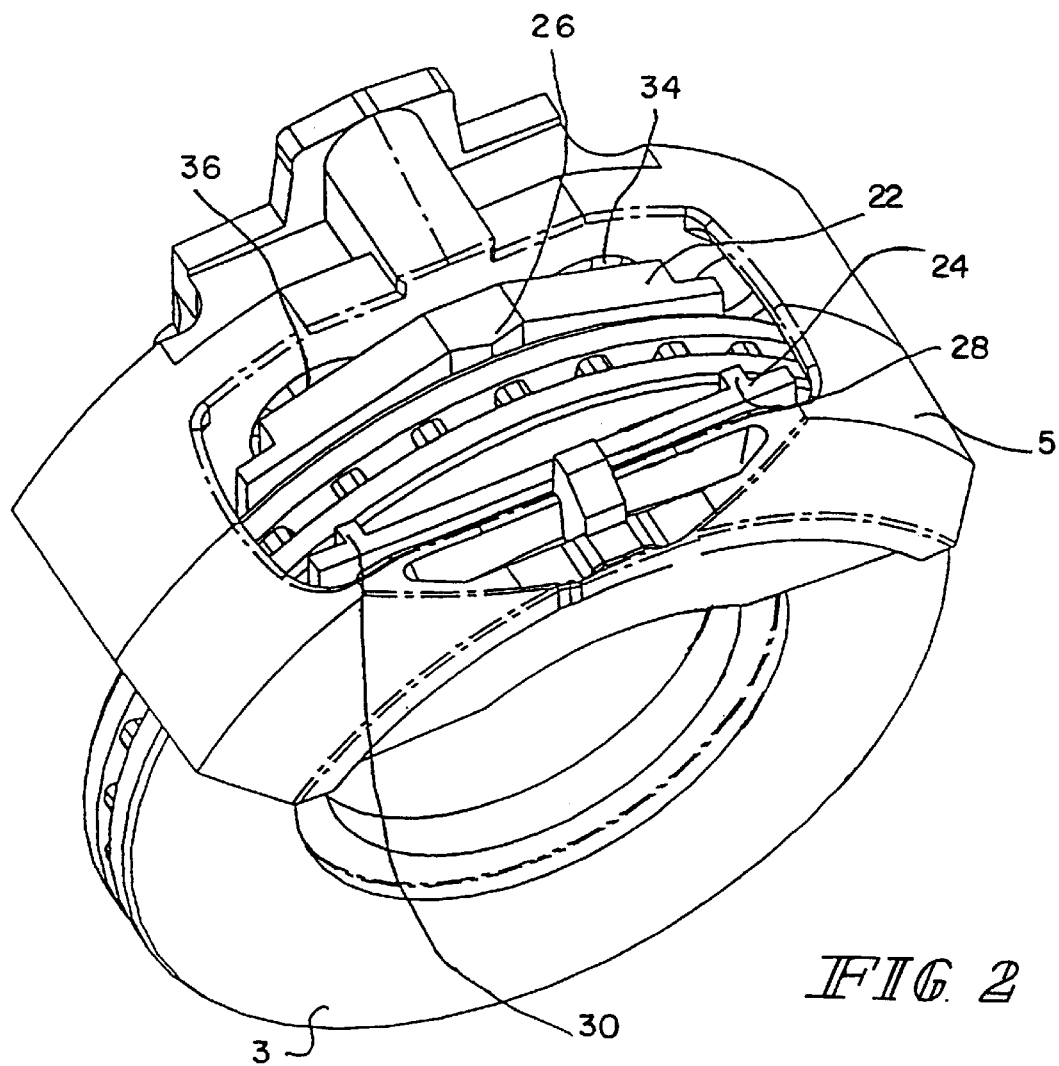
FIGS. 2 and 3 are top perspective views of a caliper-type brake with an installed breaking device.
Figure 3:
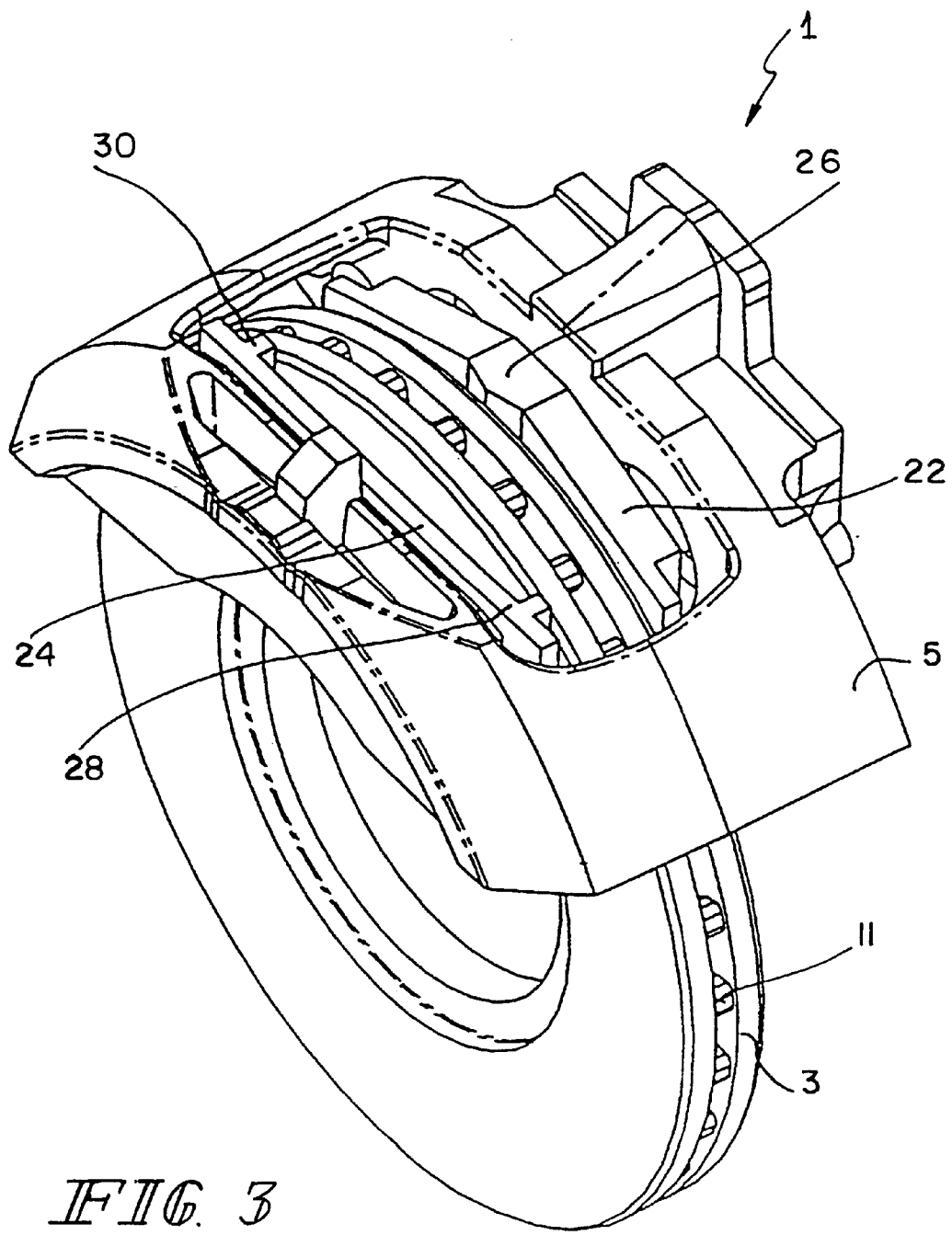

The illustrated embodiment of the breaking tool with two breaking irons 22, 24 in the form of brake linings opens up the simple possibility of inserting the breaking or cutting irons into the lining shafts 31, 32 of the disk brake instead of the brake linings, as illustrated in FIG. 2. In order to break the brake disk in the mounted condition, as illustrated, after the insertion of the cutting disks 22, 24 into the lining shafts 31, 32, the brake pistons 34, 36 are operated. An operation of the brake pistons can take place either pneumatically or hydraulically by simply depressing the foot brake of the vehicle. By means of the pistons 34, 36, the cutting disk 22 is first pressed against the brake disk 3. After the cutting disk 22 has engaged the brake disk 3, by way of the reaction force and the caliper, the cutting disk 24 is also pressed against the brake disk 3. As a result of the breaking webs 26, 28, 30 of the mutually opposite cutting disks, which breaking webs 26, 28, 30 are arranged offset with respect to one another in the circumferential direction, a high transverse force or a high bending moment is introduced into the brake disk 3 by the brake pistons 34, 36, causing this brake disk to break. As a result, radially extending fracturing surfaces are formed. The individual fragments can then be pulled out of the caliper in the radial direction. After the broken brake disk has been removed in this manner, it is possible to insert a new, broken or segmented, that is, multipart brake disk into the disk brake 1. FIG. 3 is another top perspective view of a caliper-type brake with an installed cutting device 22, 24 from a different perspective than that of FIG. 2. All components or parts which correspond to those of FIGS. 1 and 2 have the same reference numbers.

Naturally, it would be possible to construct the breaking tool 20 as a separate tool. A separate tool comprises at least two mutually opposite breaking or cutting irons. For breaking the brake disk, such a device is arranged at a distance from the caliper and has a separate frame and a separate device for operating the cutting irons. The cutting irons, in turn, comprise breaking webs which are arranged offset for mutually opposite cutting irons.

The present invention provides a system and a process for breaking a brake disk, particularly a flat-fit disk or neckless disk, of a disk brake in the mounted condition. In a particularly preferred embodiment, it is provided to construct the cutting tool by using two cutting irons which can be inserted into the lining shafts of the brake lining, in this embodiment, the cutting force being applied by the brake pistons themselves and thus internally by the brake system, which has considerable cost-related advantages.

The breaking device according to the invention permits the use of unbroken brake disks with the original equipment, which has considerable cost-related advantages. A complete dismounting of the hub and other components, particularly when used in utility vehicles, in order to be able to exchange the worn-out brake disk, is no longer required as the result of the braking device according to the invention.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. A process for dismounting an unbroken brake disk of a disk brake in the mounted condition, the process comprising:

setting a breaking device onto the brake disk, applying a force on the breaking device by a pressure device such that a transverse force or a bending moment is introduced into the brake disk which results in fracture of the brake disk with radially extending fracturing surfaces.

2. A process according to claim 1, wherein the breaking device is constructed as a separate tool which is set onto the brake disk away from a caliper of the disk brake.

3. A process according to claim 1, wherein the breaking device comprises at least two breaking irons which, with respect to their outer contour, are constructed to be similar to brake linings, and wherein the step of setting further includes step of inserting the breaking irons into the lining shaft of the disk brake.

4. A process according to claim 3, wherein the transverse force is introduced by brake piston of the disk brake.

5. A process according to claim 4, wherein the brake piston of the disk brake is operated pneumatically or hydraulically by a foot brake of a vehicle.

6. A process according to claim 1 including subsequent steps of removing fragments of the broken disk from a caliper in the radial direction without dismounting axle parts or brake parts, and then installing a new multipart brake disk.

7. A breaking device to fracture an unbroken disk while the disk is mounted on a disk brake, the brake having a disk, a pair of brake linings disposed in a conventional fashion by being mounted in an opposing and facing relationship with respect to each face of the disk, and a lining shaft, the device comprising:

at least two distinct and unconnected breaking irons, each breaking iron being removably insertable into the lining shaft in a mutually opposite manner wherein inward facing surfaces of each breaking iron shall face one another on opposite sides of the brake disk, and the inward facing surfaces shall be formed so as to create a breaking moment on the break disk sufficient to fracture the disk when the brake lining is pressed toward the disk.

8. A breaking device as in claim 7, wherein the inward-facing surfaces of the breaking irons have opposed breaking webs.

9. A breaking device as in claim 8, wherein the breaking webs of each opposed breaking iron are offset from one another so that each breaking web will contact the disk at a distinct point along the circumference of the disk.

10. A breaking device as in claim 7, wherein outward facing surfaces of each breaking device are generally planar in order to conform to the shape of the brake lining.

* * * * *